US011084347B2

(12) United States Patent
Wolf-Monheim

(10) Patent No.: US 11,084,347 B2
(45) Date of Patent: Aug. 10, 2021

(54) MOTOR VEHICLE REAR WHEEL SUSPENSION SYSTEM

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 16/380,202

(22) Filed: Apr. 10, 2019

(65) Prior Publication Data

US 2019/0315171 A1 Oct. 17, 2019

(30) Foreign Application Priority Data

Apr. 11, 2018 (DE) .......................... 102018205429.0

(51) Int. Cl.
*B60G 3/24* (2006.01)
*B60G 21/05* (2006.01)
*B60G 7/00* (2006.01)

(52) U.S. Cl.
CPC .............. *B60G 3/24* (2013.01); *B60G 7/008* (2013.01); *B60G 21/05* (2013.01); *B60G 2200/144* (2013.01); *B60G 2200/4622* (2013.01); *B60G 2204/148* (2013.01); *B60G 2204/422* (2013.01);
(Continued)

(58) Field of Classification Search
CPC .......... B60G 3/24; B60G 21/05; B60G 7/008; B60G 2200/144; B60G 2206/124; B60G 2204/148; B60G 2204/422; B60G 2206/1112; B60G 2200/4622; B60G 2200/143; B60G 2200/13; B60G 7/02;
(Continued)

(56) References Cited

U.S. PATENT DOCUMENTS 4,480,852 A * 11/1984 Rumpel ................. B60G 3/202
280/124.144
4,603,882 A * 8/1986 Kijima ................... B60G 3/205
267/248
4,779,893 A 10/1988 Juechter
(Continued)

FOREIGN PATENT DOCUMENTS

DE 4129376 C2 7/2000
DE 10014878 A1 9/2001
(Continued)

OTHER PUBLICATIONS

"FAQ: Steering and Suspension", Webpage, Braden's I Care Auto Repair, badensauto.com.

*Primary Examiner* — Darlene P Condra
(74) *Attorney, Agent, or Firm* — Raymond L. Coppiellie; Burgess Law Office, PLLC

(57) ABSTRACT

A motor vehicle independent rear-wheel suspension system including a left-hand and a right-hand transverse link, each articulated at an inner end on a chassis of the motor vehicle and fixedly connected at an outer end to a wheel carrier. The suspension system having a left-hand and a right-hand trailing arm unit. Each trailing arm unit articulated a front end on the chassis of the motor vehicle and at a rear end on a wheel carrier. Open installation space is formed between the trailing arm units and the transverse links for at least a partial accommodation of an electrical drive train.

17 Claims, 2 Drawing Sheets

(52) U.S. Cl.
CPC ............... *B60G 2206/1112* (2013.01); *B60G 2206/124* (2013.01)

(58) Field of Classification Search
CPC . B60G 3/14; B60G 3/202; B60G 3/18; B60G 3/20
See application file for complete search history.

(56) References Cited

U.S. PATENT DOCUMENTS

| | | | |
|---|---|---|---|
| 4,832,363 A * | 5/1989 | Mitobe | B60G 3/202 |
| | | | 280/124.128 |
| 4,848,788 A | 7/1989 | Rumpel | |
| 5,340,146 A | 8/1994 | Kato | |
| 5,364,121 A * | 11/1994 | Lee | B60G 21/051 |
| | | | 280/124.164 |
| 5,829,764 A * | 11/1998 | Griffiths | B60G 3/26 |
| | | | 280/5.52 |
| 7,588,260 B2 | 9/2009 | Lopez et al. | |
| 8,708,359 B2 | 4/2014 | Murray | |
| 2016/0083012 A1 * | 3/2016 | Stenzenberger | H01M 2/1083 |
| | | | 180/62 |
| 2018/0154717 A1 * | 6/2018 | Neu | B62D 7/20 |

FOREIGN PATENT DOCUMENTS

| | | |
|---|---|---|
| DE | 19611114 B4 | 11/2005 |
| GB | 2303340 A | 2/1997 |

* cited by examiner

MOTOR VEHICLE REAR WHEEL SUSPENSION SYSTEM

BACKGROUND OF THE INVENTION

1. Field of the Invention

The present invention relates generally to a vehicle suspension; and, more specifically to an independent rear-wheel suspension system of a motor vehicle.

2. Description of Related Art

Elastic spring elements between a body of a motor vehicle as a sprung object and the wheels of the vehicle as unsprung objects enhances vehicle ride comfort. The spring elements reduce jolt transmission, caused by uneven ground surfaces, directly to the vehicle body. The spring elements also assist in maintaining wheel to ground contact necessary for force transmission on irregular ground surfaces. Vehicle body oscillations, incited by uneven ground surfaces are conventionally dampened by shock absorbers, arranged between the vehicle body and the wheel axles. The elastic spring elements may be formed, for example, by flexible coil springs and may be an integral part of the shock absorbers.

Widely varying forms of motor vehicle wheel suspensions exist. Independent wheel suspensions are predominantly used for the front and rear axles of automobiles and rigid axle suspensions on commercial vehicles, for example, trucks, mainly on their rear axles.

With rigid rear axles, the transverse stiffness and the torsional stiffness in the area where the wheels are attached have an influence on wheel attitude, wheel tracking, and wheel camber, under the dynamic stresses that occur in driving.

SUMMARY OF THE INVENTION

An independent rear-wheel suspension system of a motor vehicle including a left-hand transverse link and a right-hand transverse link, the left-hand transverse link articulated at an inner end on a chassis of the motor vehicle and connected at an outer end to a left-hand wheel carrier and the right-hand transverse link articulated at an inner end on the chassis of the motor vehicle and connected at an outer end to a right-hand wheel carrier. The suspension having a left-hand trailing arm unit and a right-hand trailing arm unit, the left-hand trailing arm unit having first and second left-hand trailing arms, the right-hand trailing arm unit having first and second right-hand trailing arms. The first and second left-hand trailing arms of the left-hand trailing arm unit each articulated at a front end on the chassis of the motor vehicle and at a rear end on the left-hand wheel carrier and the first and second right-hand trailing arms of the right-hand trailing arm unit each articulated at a front end on the chassis of the motor vehicle and at a rear end on the right-hand wheel carrier. The articulated front ends of the first and second left-hand trailing arms occupy the same space in a plan view and are separated in a vertical direction and the articulated front ends of the first and second right-hand trailing arms occupy the same space in a plan view and are separated in the vertical direction. The suspension system having an open installation space formed between the left-hand trailing arm unit and right-hand trailing arm unit and in front of the left-hand transverse link and right-hand transverse link.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
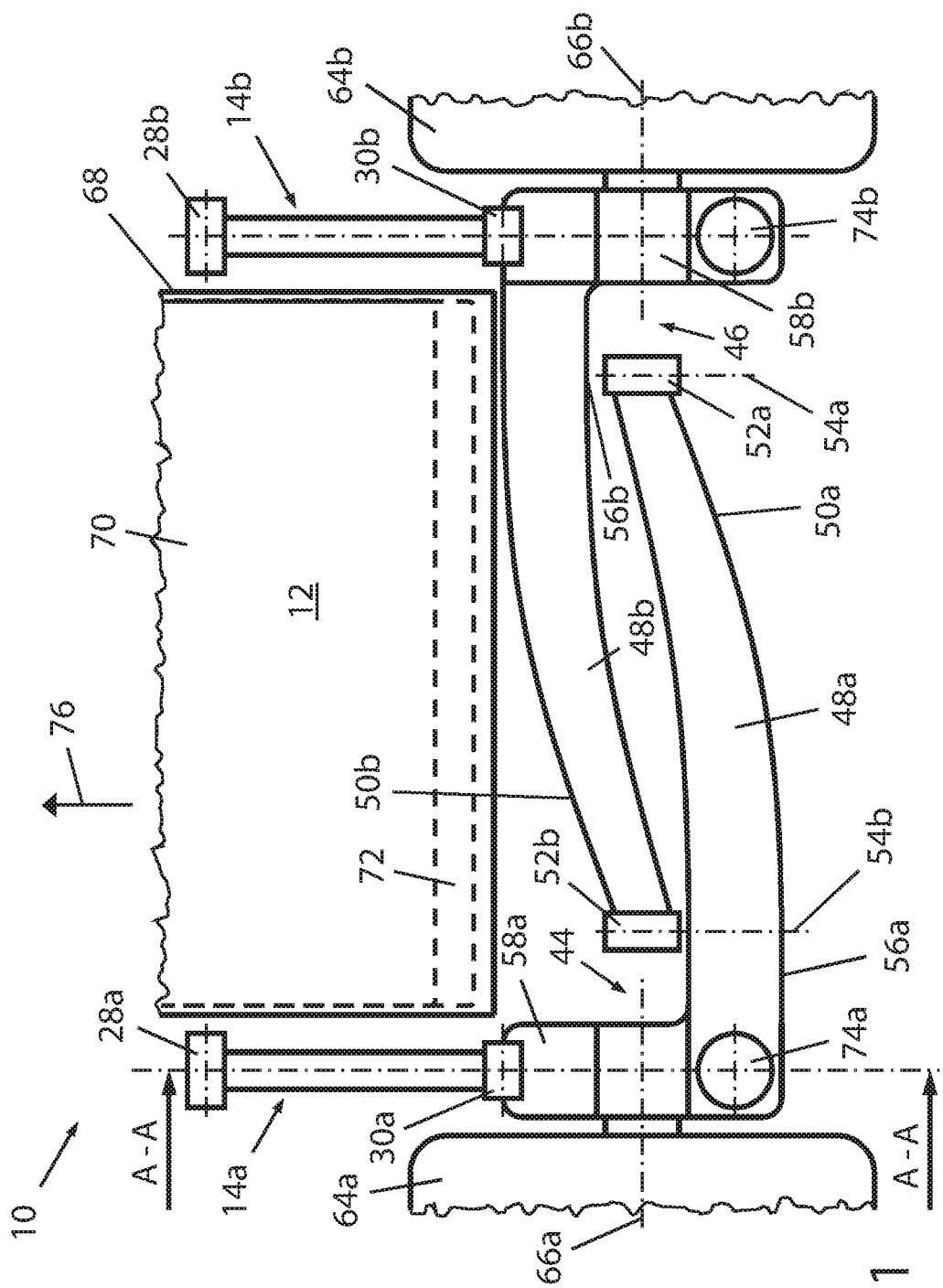
FIG. 1 is a schematic plan or top view of an independent rear-wheel suspension system according to an embodiment of the invention.

The following description of the preferred embodiment(s) is merely exemplary in nature and is in no way intended to limit the invention, its application, or uses.

In the different figures, identical parts are always provided with the same reference numerals, for which reason these are generally also described only once. For reasons of simplicity, the letters "a" and "b" are appended to the relevant reference numerals to differentiate similar parts arranged on the left or on the right, in which case parts with the same reference numeral arranged on the right and on the left may be of laterally inverted design.

As used herein the term "direction of travel" refers to movement in the direction of the longitudinal axis of the vehicle. As used herein the term "left-hand" refers to the left side of the vehicle, in particular, the side of the vehicle located closer to the left hand of a driver facing forward—toward the front end of the vehicle. As used herein the term "right-hand" refers to the right side of the vehicle, in particular, the side of the vehicle located closer to the right hand of a driver facing forward—toward the front end of the vehicle.

FIG. 1 is a schematic top view of an independent rear-wheel suspension system, seen generally at 10, according to an embodiment of the invention in an electrically powered motor vehicle.

The motor vehicle includes an electric drive train that includes an electric drive motor (not shown), a rechargeable battery (accumulator)—an electric power source 70 for supplying the electric drive motor, and a power electronics unit 72 controlling the power supply from the electric power source 70 to the electric drive motor.

The electric power source 70 and the power electronics unit 72 are arranged inside a common housing 68, which is fixedly connected to the chassis 62 of the motor vehicle, to limit its unsprung mass.

The independent rear-wheel suspension system 10 includes two wheel carriers 58a, 58b, each rotatably supporting a rear road wheel 64a, 64b, a wheel-tire combination, about an axle 66a, 66b.

The independent rear-wheel suspension system 10 further includes a left-hand trailing arm unit 14a and a right-hand trailing arm unit 14b, arranged on respective sides of the motor vehicle, each trailing arm unit 14a, 14b including two trailing arms 16a, 16b, 18a, 18b. The two trailing arms 16a, 16b, 18a, 18b of each of the trailing arm units 14a, 14b extend parallel to a direction of travel 76 of the motor vehicle and are arranged one above the other separated by a distance from one another in the vertical direction. The trailing arms 16a, 16b, 18a, 18b of each trailing arm unit 14a, 14b are each articulated at a front end 20a, 22a on the chassis 62 of the motor vehicle and at a rear end 24a, 26a on one of the wheel carriers 58a, 58b. Elastomer bearing bushes 28a, 30a, 32a, 34a positioned at the front ends 20a, 22a and at the rear ends 24a, 26a of the trailing arms 16a, 18a of each trailing arm unit 14a, 14b producing an articulated joint enabling relative movement between the chassis 62 and the wheel carrier 58a, 58b. Swivel axes 36a, 38a, 40a, 42a of the elastomer bearing bushes 28a, 30a, 32a, 34a are oriented parallel to one another and perpendicular to the trailing arms 16a, 18a. As used herein the term "articulate" or "articulated" means connect by a flexible joint or be connected by a flexible joint.

Figure 2:
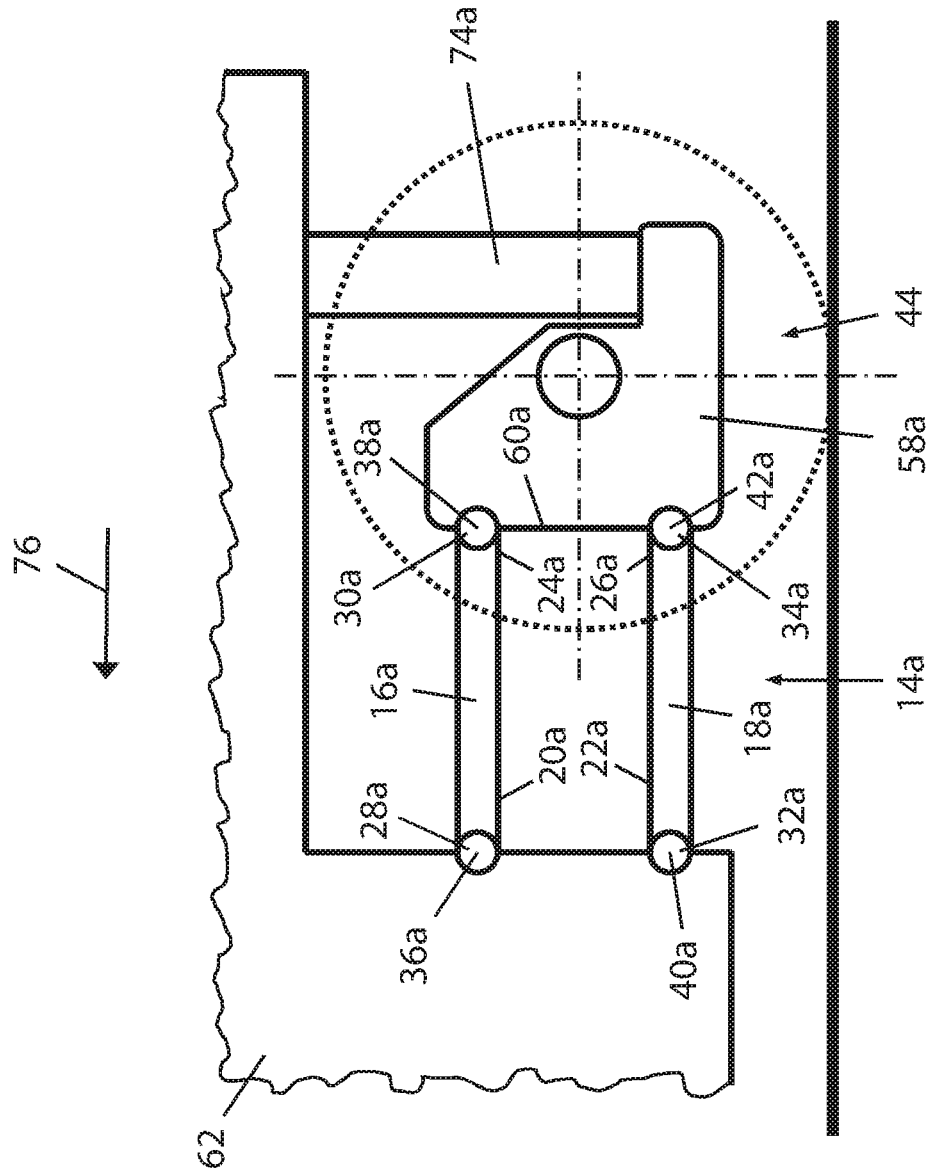
FIG. 2 is a schematic sectional side view of the independent rear-wheel suspension system of FIG. 1.

FIG. 2 shows, for each of the trailing arm units 14a, 14b, the front positions of the articulation of the two trailing arms 16a, 18a and the rear positions of the articulation of the two trailing arm 16a, 18a arranged at the same space or position, in a direction parallel to the direction of travel 76, and separated by a distance from one another in the vertical direction. FIG. 2 shows an operational or static load state, wherein the independent rear-wheel suspension system 10 is subjected only to a static load of the vehicle body, with the two trailing arms 16a, 18a of each of the trailing arm units 14a, 14b oriented horizontally. In this arrangement the two trailing arms 16a, 18a of each of the trailing arm units 14a, 14b, the chassis 62, and the wheel carrier 58a, 58b form a flat linkage. Under a compression and rebound of the rear road wheel 64a, 64b the three-dimensional orientation of the wheel carrier 58a, 58b, for example, the vertically arranged front face 60a, is maintained. The term "same space or position" refers to space, location, or position when looking at a plan view, wherein the plan view is a top or horizontal view of an object.

FIG. 1 shows the independent rear-wheel suspension system 10 having a left-hand transverse link 48a and a right-hand transverse link 48b. Each transverse link 48a, 48b having an inner end 50a, 50b and an outer end 56a, 56b. Each transverse links 48a, 48b articulated at the inner end 50a, 50b on the chassis 62 of the motor vehicle. An elastomer bearing bush 52a, 52b at the inner ends 50a, 50b of the two transverse links 48a, 48b producing an articulated joint. In alternative embodiments, the articulated joint may also be produced using a ball joint.

The transverse links 48a, 48b are each fixedly connected at their outer end 56a, 56b to one of the wheel carriers 58a, 58b. The fixed connection designed so each of the wheel carriers 58a, 58b forms an integral unit 44, 46 with one of the transverse links 48a, 48b, in one embodiment each wheel carriers 58a, 58b is formed in one piece with the corresponding transverse link 48a, 48b. FIG. 1 shows the integral units 44, 46 with the wheel carrier 58a, 58b and the transverse link 48a, 48b having an L-shape. When referring to the integral unit 44, 46, the term "integral" means the transverse links and wheel carriers are a single-piece component—a one-piece construction, something that is homogeneously formed, for example, components molded, cast or otherwise formed as a single unitary body. Not, individual parts fastened by some fastening mechanism.

The elastomer bearing bushes 52a, 52b forming an articulated joint at the inner ends 50a, 50b of the two transverse links 48a, 48b are arranged in the direction of travel 76 and have swivel axes 54a, 54b, which run parallel to the direction of travel 76. Swivel axis as used herein means to turn, pivot, or rotate on or about an axis; for example, joining two parts so that one or both can pivot freely—as on or about a bolt or pin.

The integral units 44, 46 including the left-hand transverse link 48a and a left-hand wheel carrier 58a or the right-hand transverse link 48b and the right-hand wheel carrier 58b are not mirror-symmetrical, nor are they interconvertible through rotation about a point—point-symmetrical. This allows the two transverse links 48a, 48b, despite the need for a symmetrical position in relation to the trailing arm units 14a, 14b, to be arranged in the manner in FIG. 1, in which the two transverse links 48a, 48b in an operational state, for the most part, overlap one another in the direction of travel 76.

In the present embodiment, the right-hand transverse link 48b is arranged in front of the left-hand transverse link 48a in the direction of travel 76. In other, correspondingly modified embodiments the left-hand transverse link 48a may also be arranged in front of the right-hand transverse link 48b.

The inner ends 50a, 50b of the transverse links 48a, 48b extend towards the opposite side of the motor vehicle wherein the elastomer bearing bush 52a, 52b forming the articulated joint of the two transverse links 48a, 48b is arranged in an area close to the connection between the outer end 56a, 56b of the other transverse link 48a, 48b and one of the wheel carriers 58a, 58b. The foregoing providing a compact construction of the transverse links 48a, 48b and achieving a swiveling range, or range of movement, sufficient for a vertical movement of the rear road wheels 64a, 64b.

A curvature between the inner end 50a, 50b and the outer end 56a, 56b, formed such that in an operational state the concave sides of the curved portions of the two transverse links 48a, 48b face one another, increases the compactness of the arrangement of the transverse links 48a, 48b.

The trailing arms 16a, 18a of each of the trailing arm units 14a, 14b and the transverse links 48a, 48b may be produced from steel. For weight-saving reasons, however, the trailing arms 16a, 18a of each of the trailing arm units 14a, 14b and the transverse links 48a, 48b may also, for the most part, be produced from a composite material. The term "for the most part" means, in particular, a proportion of more than 50% by volume, preferably more than 70% by volume and more preferably more than 90% by volume. The term should include the possibility that the trailing arms and the transverse links are composed entirely, 100% by volume, of the composite material.

The composite material may include, for example, a fiber-reinforced composite. The composite material may comprise carbon fiber-reinforced plastic, glass fiber-reinforced plastic, and aramid fiber-reinforced plastic.

A left-hand spring-and-shock absorber unit 74a and a right-hand spring-and-shock absorber unit 74b are provided in the independent rear-wheel suspension system 10. The spring-and-shock absorber units 74a, 74b are attached at one end, remote from the wheel 64, to the chassis 62 and at an opposing end, near the wheel 64, to one of the integral units 44, 46 having a wheel carrier 58a, 58b and a transverse link 48a, 48b. Each of the two integral units 44, 46, in an area facing the wheel 64, includes a mechanism for attaching one of the spring-and-shock absorber units 74a, 74b. While identified here as a spring-and-shock absorber unit, the spring-and-shock absorber unit may be two separate and distinct components, for example, a spring and a shock absorber.

FIG. 2 shows an operational state subjected only to the static load of the vehicle body, with the spring-and-shock absorber units 74a, 74b arranged vertically, avoiding the increased friction or jamming in spring-and-shock absorber units 74a, 74b of telescopic design.

Between the trailing arm units 14a, 14b and the transverse links 48a, 48b is an open installation space 12, which is not affected by movement of the trailing arms 16a, 18a of each of the trailing arm units 14a, 14b or the transverse links 48a, 48b during operation of the independent rear-wheel suspension system 10 and which can therefore be assigned to other components of the motor vehicle not forming part of the chassis. As used herein the term "open installation space" refers to an open space in which something is or can be installed.

In the present exemplary embodiment, the open installation space 12 provides space for at least partial accommodation of the electrical drive train of the motor vehicle. For example, the open installation space 12 may include one end of the housing 68 having the electrical power source 70 and the power electronics unit 72 situated therein, just in front of the start of a movement range of the transverse link 48b arranged right at the front.

In the disclosed embodiment, the independent rear-wheel suspension system 10 is used with a motor vehicle having an electric drive train. The independent rear-wheel suspension system 10 includes a left-hand trailing arm unit 14a and a right-hand trailing arm unit 14b, each having two trailing arms 16a, 16b, 18a, 18b and a left-hand and a right-hand transverse link 48a, 48b. The transverse links 48a, 48b connected at an inner end 50a, 50b, with an articulated joint on a chassis 62 of the motor vehicle and fixedly connected at an outer end 56a, 56b to a wheel carrier 58a, 58b.

The trailing arms 16a, 16b, 18a, 18b of each trailing arm unit 14a, 14b can each be joined at a front end 20a, 22a on the chassis 62 of the motor vehicle and at a rear end 24, 26 on one of the wheel carriers 58a, 58b, the foregoing arrangement forming an open installation space 12 between the trailing arm units 14a, 14b and the transverse links 48a, 48b.

The open installation space 12 may serve to accommodate at least part of an electric drive train of the motor vehicle.

The proposed arrangement of transverse links 48a, 48b and trailing arms 16a, 16b, 18a, 18b of the independent rear-wheel suspension system 10 provides an open installation space 12, in particular an installation space having a substantially rectangular shape, which in an operating state of the independent rear-wheel suspension system 10 remains free of oscillating movements of the trailing arms or transverse links. This open installation space 12 may be assigned to other components of the motor vehicle not forming part of the chassis, and in particular to at least a part of the electric drive train of the motor vehicle, for example, an electric power source 70. In one suitable embodiment, a swiveling range or range of movement can be achieved sufficient for a vertical movement and a movement in the direction of travel or counter to it.

In an operational state, the outer end 56a, 56b of the transverse link 48a, 48b is the end of the relevant transverse link facing the wheel carrier 58a, 58b. In an operational state, the inner end 50a, 50b of the transverse link is the end of the relevant transverse link remote from the wheel carrier 58a, 58b.

The terms "in front of" and "front" and "behind" and "rear" relate to an intended forward direction of travel of the motor vehicle.

In the disclosed embodiment, the independent rear-wheel suspension system 10 is used with an electrically powered motor vehicle. The term "motor vehicle" means an automobile, a truck, a semitrailer truck or a motor bus.

The articulated joint or swivel connection of the trailing arms 16a, 16b, 18a, 18b of each trailing arm unit 14a, 14b both at the front end 20a, 22a and at the rear end 22a, 22b is preferably produced by elastomer bearing bushes 28, 30, 32, 34, wherein the swivel axes 36, 38, 40, 42 of the elastomer bearing bushes are oriented parallel to one another and perpendicular to the trailing arms 16a, 16b, 18a, 18b. This represents a way of providing an adequate swiveling range of the trailing arms 16a, 16b, 18a, 18b of each trailing arm unit 14a, 14b.

In an embodiment of the independent rear-wheel suspension system 10, the front positions of articulation 36a, 40a of the two trailing arms 16a, 18a and the rear positions of articulation 38a, 42a of the two trailing units 16a, 18a can be in the same position, viewed from above and in the intended forward direction of travel, and separated vertically by a distance from one another as shown in FIG. 2. This compact design guides movement of the trailing arms 16a, 18a during operation of the independent rear-wheel suspension system. Movement of the trailing arms 16a, 18a of the trailing arm unit 14a corresponds to a movement of a flat linkage about a neutral position defined by the elastomer bearing bushes 28a, 30a, 32a, 34a.

In an operational state, subject only to a static load of the vehicle body, the two trailing arms 16a, 18a of each trailing arm unit 14a are preferably oriented substantially horizontally. Wherein during operation of the independent rear-wheel suspension system the rear positions of the articulation 38a, 42a of the two trailing arms 16a, 18a of the trailing arm unit 14a remain one above the other at the same vertical distance, so the wheel carrier 58, on which the trailing arms of the trailing arm unit are articulated, retains its three-dimensional orientation.

An elastomer bearing bush or a ball joint 52a, 52b enables articulation of the inner ends 50a, 50b of the two transverse links 48a, 48b, providing a designed articulation affording sufficient freedom of movement.

In an embodiment in which elastomer bearing bushes 52a, 52b enable the articulation of the inner ends 50a, 50b of the two transverse links 48a, 48b, the elastomer bearing bushes 52a, 52b are arranged substantially in the direction of travel. The swivel axes of the elastomer bearing bushes 52a, 52b extending parallel to the forward direction of travel, with the two transverse links 48a, 48b, in the operational state, for the most part, overlap one another in the direction of travel. The elastomer bearing bushes 52a for the articulation of one transverse links 48a arranged in an area close to the connection between the outer end 56b of the other transverse link 48b and one of the wheel carriers 58b. The term "for the most part overlap" means a proportional overlap of more than 50%, preferably more than 60% and, more preferably more than 70%.

The foregoing provides a compact arrangement of the two transverse links 48a, 48b with the length of the transverse links 48a, 48b providing a sufficient swiveling range for a vertical movement of the rear wheels of the motor vehicle.

The transverse links 48a, 48b having a curvature between the inner end 50a, 50b and the outer end 56a, 56b. The curvature formed such that in the operational state concave sides of the curved portions of the two transverse links face one another, providing a compact arrangement of the two transverse links 48a, 48b and thereby the independent rear-wheel suspension system 10.

In an embodiment of the independent rear-wheel suspension system 10 two wheel carriers 58a, 58b are provided, each rotatably supporting a rear road wheel about an axle, wherein each wheel carrier 58a, 58b forms an integral unit with one of the transverse links 48*a*, 48*b*. Each wheel carrier 58*a*, 58*b* may be formed in one piece with a corresponding transverse link 48*a*, 48*b*, the fixed or integral connection between the transverse link and the wheel carrier transferring force between these two components.

A spring-and-shock absorber unit 74 connects to each integral unit, wheel carrier 58 and transverse link 48, in an area facing the wheel providing known advantages of a spring strut type of independent wheel suspension. In addition, the spring-and-shock absorber units 74*a*, 74*b* may be arranged in an area in which they operate effectively without adversely impinging on the open installation space between the trailing arm units and the transverse links.

In a further embodiment, the motor vehicle includes an electric drive train. The drive train including at least one electric drive motor, an electrical power source for supplying the electric drive motor, and a power electronics unit that controls the power supply from the electrical power source to the electric drive motor. The motor vehicle equipped with an independent rear-wheel suspension system 10 including right and left side spring-and-shock absorber units. The spring-and-shock absorber units attached at an end remote from the wheel to the chassis of the motor vehicle and at an end facing the wheel to one of the integral units. The electrical drive train positioned, at least partially, in the open installation space between the trailing arm units and the transverse links.

Using the independent rear-wheel suspension system 10 provides an electrically powered motor vehicle with good ride comfort. The independent rear-wheel suspension system 10 makes it possible to avoid restrictions on the shape and size of the installation space needed to accommodate the electrical drive train. The installation space can be adapted, for example, to the electrical power source, which can be optimally configured to the requirements resulting from the electrical drive of the motor vehicle. Here the electrical power source may be formed by at least one power storage device, for example, a rechargeable accumulator, and by at least one power converter, for example, a stack of fuel cells The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An independent rear-wheel suspension system of a motor vehicle comprising:
    a left-hand trailing arm unit and a right-hand trailing arm unit, the left-hand trailing arm unit having first and second left-hand trailing arms, the right-hand trailing arm unit having first and second right-hand trailing arms;
    a left-hand transverse link and a right-hand transverse link, the left-hand transverse link having an inner end, an elastomeric bearing at the inner end, the elastomeric bearing having a swivel axis extending parallel a direction of vehicle travel, and an outer end, the outer end connected to a left-hand wheel carrier and the right-hand transverse link having an inner end, an elastomeric bearing at the inner end, the elastomeric bearing having a swivel axis extending parallel a direction of vehicle travel, and an outer end, the outer end connected to a right-hand wheel carrier;
    the first and second left-hand trailing arms of the left-hand trailing arm unit each articulated at a front end on a chassis of the motor vehicle and at a rear end on the left-hand wheel carrier and the first and second right-hand trailing arms of the right-hand trailing arm unit each articulated at a front end on the chassis of the motor vehicle and at a rear end on the right-hand wheel carrier;
    the articulated front ends of the first and second left-hand trailing arms occupy the same space in a plan view and are separated in a vertical direction;
    the articulated front ends of the first and second right-hand trailing arms occupy the same space in a plan view and are separated in the vertical direction; and
    an open installation space formed between the left-hand trailing arm unit and right-hand trailing arm unit and in front of the left-hand transverse link and right-hand transverse link; and
    the left-hand transverse link having a curvature between the inner end and the outer end wherein the left-hand transverse link has a concave side and the right-hand transverse link having a curvature between the inner end and the outer end, wherein the right-hand transverse link has a concave side; and
    the concave side of the left-hand transverse link facing the concave side of the right-hand transverse link.

2. The independent rear-wheel suspension system of claim 1 including elastomer bearing bushes at the front ends and the rear ends of the first and second left-hand trailing arms and the first and second right-hand trailing arms, each elastomer bearing bush having a swivel axis, each swivel axis oriented parallel to one another and perpendicular to the first and second left-hand trailing arms and the first and second right-hand trailing arms.

3. The independent rear-wheel suspension system of claim 1 wherein first and second left-hand trailing arms and first and second right-hand trailing arms extend horizontally in a static load state.

4. The independent rear-wheel suspension system of claim 1 including the left-hand transverse link having an inner end and an elastomer bearing bush at the inner end of the left-hand transverse link; and
    the right-hand transverse link having an inner end and an elastomer bearing bush at the inner end of the right-hand transverse link.

5. The independent rear-wheel suspension system of claim 4 wherein the elastomer bearing bush of the left-hand transverse link and the elastomer bearing bush of the right-hand transverse link each have a swivel axis, each swivel axis extending parallel to a direction of travel; and
    the elastomer bearing bush of the left-hand transverse link positioned adjacent a connection between the outer end of the right-hand transverse link and the right-hand wheel carrier and the elastomer bearing bush of the right-hand transverse link positioned adjacent a connection between the outer end of the left-hand transverse link and the left-hand wheel carrier.

6. The independent rear-wheel suspension system of claim 1 including the left-hand wheel carrier and left-hand transverse link being an integral unit and the right-hand wheel carrier and right-hand transverse link being an integral unit.

7. The independent rear-wheel suspension system of claim 6 including a left-side spring-and-shock absorber unit connected to the left-hand wheel carrier and left-hand transverse link integral unit and a right-side spring-and-shock absorber unit connected to the right-hand wheel carrier and right-hand transverse link integral unit.

8. A motor vehicle comprising:
    an electrical drive train including, an electrical power source;

a left-hand trailing arm unit and a right-hand trailing arm unit, the left-hand trailing arm unit having first and second left-hand trailing arms, the right-hand trailing arm unit having first and second right-hand trailing arms;

a left-hand transverse link and a right-hand transverse link, the left-hand transverse link having an inner end, an elastomeric bearing at the inner end, the elastomeric bearing having a swivel axis extending parallel a direction of the motor vehicle travel, and an outer end, the outer end connected to a left-hand wheel carrier and the right-hand transverse link having an inner end, an elastomeric bearing at the inner end, the elastomeric bearing having a swivel axis extending parallel a direction of vehicle travel, and an outer end, the outer end connected to a right-hand wheel carrier;

the first and second left-hand trailing arms of the left-hand trailing arm unit each articulated at a front end on the chassis of the motor vehicle and at a rear end on the left-hand wheel carrier and the first and second right-hand trailing arms of the right-hand trailing arm unit each articulated at a front end on the chassis of the motor vehicle and at a rear end on the right-hand wheel carrier, first and second left-hand trailing arms and first and second right-hand trailing arms extend horizontally in a static load state;

the articulated front ends of the first and second left-hand trailing arms occupy the same space in a plan view and are separated in a vertical direction;

the articulated front ends of the first and second right-hand trailing arms occupy the same space in a plan view and are separated in the vertical direction; and an open installation space formed between the left-hand trailing arm unit and right-hand trailing arm unit and in front of the left-hand transverse link and right-hand transverse link; and a portion of the electrical drive train in the open installation space.

9. An independent rear-wheel suspension system of a motor vehicle comprising:

a left-hand trailing arm unit and a right-hand trailing arm unit, the left-hand trailing arm unit having first and second left-hand trailing arms, the right-hand trailing arm unit having first and second right-hand trailing arms;

a left-hand transverse link and a right-hand transverse link, the left-hand transverse link including an inner end and an outer end, the outer end of the left-hand transverse link connected to a left-hand wheel carrier and the right-hand transverse link including an inner end and an outer end, the outer end of the right-hand transverse link connected to a right-hand wheel carrier;

the inner end of the left-hand transverse link having an elastomer bearing bush and the inner end of the right-hand transverse link having an elastomer bearing bush wherein the elastomer bearing bush of the left-hand transverse link and the elastomer bearing bush of the right-hand transverse link each have a swivel axis, each swivel axis extending parallel to a direction of travel; and the elastomer bearing bush of the left-hand transverse link positioned adjacent a connection between the outer end of the right-hand transverse link and the right-hand wheel carrier and the elastomer bearing bush of the right-hand transverse link positioned adjacent a connection between the outer end of the left-hand transverse link and the left-hand wheel carrier;

the first and second left-hand trailing arms of the left-hand trailing arm unit each articulated at a front end on the chassis of the motor vehicle and at a rear end on the left-hand wheel carrier and the first and second right-hand trailing arms of the right-hand trailing arm unit each articulated at a front end on the chassis of the motor vehicle and at a rear end on the right-hand wheel carrier;

an open installation space formed between the left-hand trailing arm unit and right-hand trailing arm unit and in front of the left-hand transverse link and right-hand transverse link; and the left-hand transverse link having a curvature between the inner end and the outer end wherein the left-hand transverse link has a concave side and the right-hand transverse link having a curvature between the inner end and the outer end, wherein the right-hand transverse link has a concave side; and the concave side of the left-hand transverse link facing the concave side of the right-hand transverse link.

10. The independent rear-wheel suspension system of claim 9 wherein the articulated front ends of the first and second left-hand trailing arms occupy the same space in a plan view and are separated in a vertical direction; and the articulated front ends of the first and second right-hand trailing arms occupy the same space in a plan view and are separated in the vertical direction.

11. The independent rear-wheel suspension system of claim 9 including the left-hand wheel carrier and left-hand transverse link being an integral unit and the right-hand wheel carrier and right-hand transverse link being an integral unit.

12. The independent rear-wheel suspension system of claim 9 including elastomer bearing bushes at the front ends and the rear ends of the first and second left-hand trailing arms and the first and second right-hand trailing arms, each elastomer bearing bush having a swivel axis, each swivel axis oriented parallel to one another and perpendicular to the first and second left-hand trailing arms and the first and second right-hand trailing arms.

13. The independent rear-wheel suspension system of claim 9 wherein first and second left-hand trailing arms and first and second right-hand trailing arms extend horizontally in a static load state.

14. An independent rear-wheel suspension system of a motor vehicle comprising:

a left-hand trailing arm unit and a right-hand trailing arm unit, the left-hand trailing arm unit having first and second left-hand trailing arms, the right-hand trailing arm unit having first and second right-hand trailing arms;

a left-hand transverse link and a right-hand transverse link, the left-hand transverse link having an inner end, an elastomeric bearing at the inner end, the elastomeric bearing having a swivel axis extending parallel a direction of vehicle travel, and an outer end, the outer end connected to a left-hand wheel carrier and the right-hand transverse link having an inner end, an elastomeric bearing at the inner end, the elastomeric bearing having a swivel axis extending parallel a direction of vehicle travel, and an outer end, the outer end connected to a right-hand wheel carrier;

the first and second left-hand trailing arms of the left-hand trailing arm unit each articulated at a front end on the chassis of the motor vehicle and at a rear end on the left-hand wheel carrier and the first and second right-hand trailing arms of the right-hand trailing arm unit each articulated at a front end on the chassis of the motor vehicle and at a rear end on the right-hand wheel carrier;

the articulated front ends of the first and second left-hand trailing arms occupy the same space in a plan view and are separated in a vertical direction;

the articulated front ends of the first and second right-hand trailing arms occupy the same space in a plan view and are separated in the vertical direction; and the first and second left-hand trailing arms and first and second right-hand trailing arms extend horizontally in a static load state.

15. The independent rear-wheel suspension system of claim 14 wherein the articulated front ends of the first and second left-hand trailing arms occupy the same space in a plan view and are separated in a vertical direction; and the articulated front ends of the first and second right-hand trailing arms occupy the same space in a plan view and are separated in the vertical direction.

16. The independent rear-wheel suspension system of claim 14 including a left-hand wheel carrier and a right-hand wheel carrier, the left-hand wheel carrier and left-hand transverse link being an integral unit and the right-hand wheel carrier and right-hand transverse link being an integral unit.

17. The independent rear-wheel suspension system of claim 14 including elastomer bearing bushes at the front ends and the rear ends of the first and second left-hand trailing arms and the first and second right-hand trailing arms, each elastomer bearing bush having a swivel axis, each swivel axis oriented parallel to one another and perpendicular to the first and second left-hand trailing arms and the first and second right-hand trailing arms.

* * * * *